United States Patent [19]

Rotstein et al.

[11] 3,950,645

[45] Apr. 13, 1976

[54] INFRARED DETECTION TUBE

[75] Inventors: Jacob Rotstein, Salem; Robert J. Keyes, Waltham, both of Mass.

[73] Assignee: Massachusetts Institute of Technology, Cambridge, Mass.

[22] Filed: Sept. 21, 1964

[21] Appl. No.: 399,130

[52] U.S. Cl. .................. 250/352; 250/333; 313/388

[51] Int. Cl.[2] ........................ H01J 31/49; G01J 1/00

[58] Field of Search.............. 250/83.3 IR, 352, 333; 313/65, 66, 94, 95, 96, 388; 315/10; 178/6 IR; 338/17, 18, 19; 329/144

[56] References Cited

UNITED STATES PATENTS

| | | | |
|---|---|---|---|
| 2,739,244 | 3/1956 | Sheldon | 250/83.3 X |
| 2,816,954 | 12/1957 | Huffman | 250/83.3 |
| 2,824,235 | 2/1958 | Hahn et al. | 250/83.3 |
| 2,951,175 | 8/1960 | Null | 315/10 |
| 3,060,338 | 10/1962 | Selby et al. | 313/94 |
| 3,067,283 | 12/1962 | Petritz et al. | 178/6 X |
| 3,258,602 | 6/1966 | Promish | 250/83.3 |
| 3,274,380 | 9/1966 | Distel | 250/83.3 |
| 3,293,483 | 12/1966 | Engel | 315/10 |

*Primary Examiner*—T. H. Tubbesing
*Assistant Examiner*—S. C. Buczinski
*Attorney, Agent, or Firm*—Arthur A. Smith, Jr.; Martin M. Santa; Robert J. Horn, Jr.

EXEMPLARY CLAIM

1. An infrared imaging device comprising, cooling means for lowering the temperature of the device, a wafer of preselected infrared sensitive material, a layer of thin infrared transparent electrically conductive material deposited on one side of said wafer, a wire mosaic, said wire mosaic in intimate contact with the remaining side of said wafer, opaque material filling a preselected area between the wires of said wire mosaic, silver paste interposed between said wafer and the tips of the wires of said wire mosaic, a photoemissive surface deposited on one side of said wire mosaic, an evacuated tube having a grid, focusing means, and a phosphor screen at one end, said wire mosaic forming the other end of said tube, lamp means for illuminating said photoemissive surface thereby providing free electrons, voltage accelerating means whereby said free electrons are accelerated toward said phosphor screen and focussed on said screen in a predetermined manner, fixed bias means whereby free electrons are confined between said grid and said photoemissive cathode whereby the resistance of said infrared sensitive wafer cooperating with grid current flow reduces said bias permitting flow of electrons according to infrared radiation impinging on said wafer.

5 Claims, 3 Drawing Figures

FIG. 1
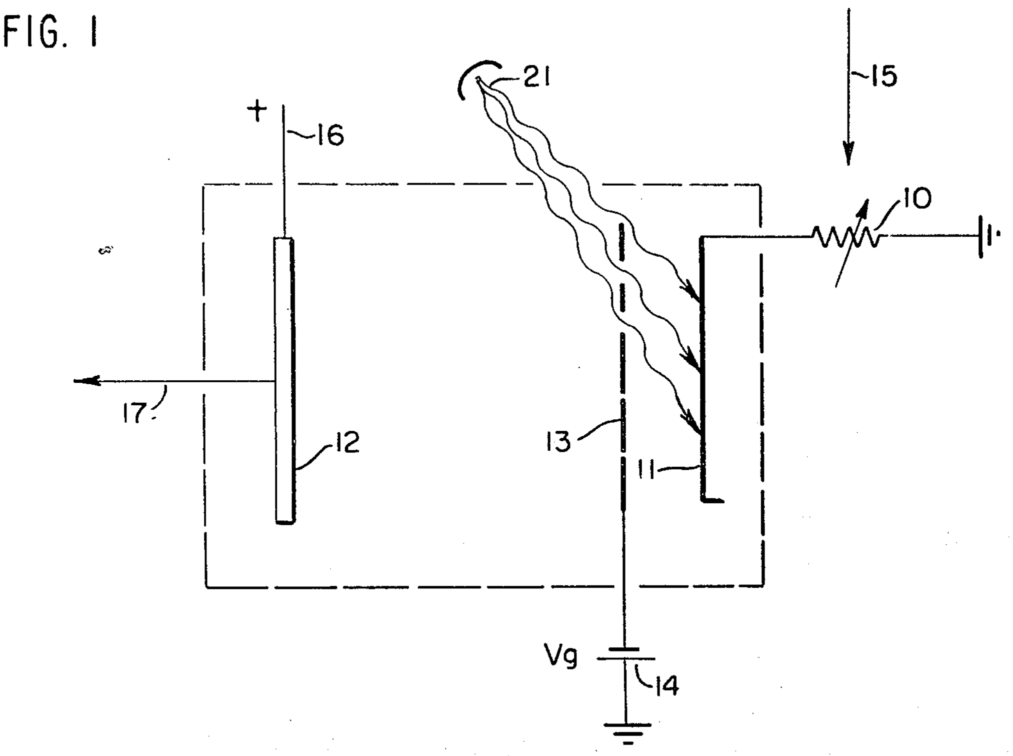
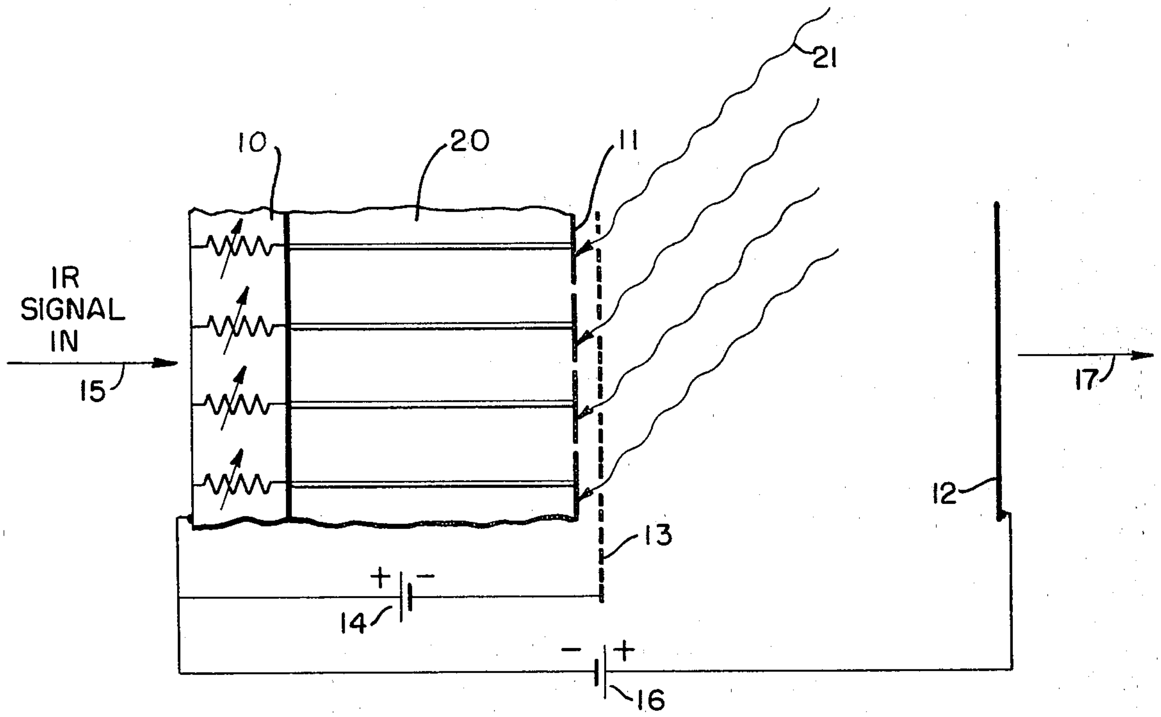
FIG. 2
INVENTORS:
JACOB ROTSTEIN
BY ROBERT J. KEYES

INVENTORS:
JACOB ROTSTEIN
BY ROBERT J. KEYES

INFRARED DETECTION TUBE

This invention relates to infrared detection tubes and more particularly to a tube that converts infrared images into visible images.

The snooperscope, a well known infrared imaging tube, has a spectral response up to 1.2 microns. Infrared imaging tubes having a greater spectral response are modified vidicons in which a sensing layer which is sensitive to infrared radiation has been selected. The sensing layers are of the bolometer or photoconductive type, and their spectral range, sensitivity, and speed of response control the overall performance of the tube. The choice of materials for the sensing layer is restricted to materials having high resistivities (on the order of $10^{11}$ or $10^{12}$ ohms per centimeter) owing to the charge-storage mode of operation of vidicon tubes. This need for high resistivity layers becomes a problem if the spectral range of the vidicon is to be extended into the long wavelength region. Furthermore, the manufacture of uniform high resistivity sensing layers is very difficult.

The present invention overcomes this limitation of the vidicon tube in that high sensitivity photoconductors can be utilized that have considerably lower resistivities providing an infrared image detection tube having a spectral response extending into the far infrared region.

Vidicon type tubes cannot be gated electrically while the present invention can in any one of several ways. This feature is exploitable in infrared radar. Return signals will include reflections from intermediate targets such as clouds and the like as well as returns from the desired field of interest. Vidicon type receivers integrate all return signals together producing an obscured picture of the desired field of interest. The present invention when gated "off" during the interval of returns from intermediate targets will produce a clear picture of the desired field of interest.

The present invention is of relatively simple construction and has minimal power requirements; therefore, will be found useful in portable systems. No amplification is needed for direct readout. However, if electrical readout is desired, the tube can be combined with a T.V. vidicon, an image dissector, or it can constitute the front end of an image orthicon.

Therefore, an object of the present invention is to provide an imaging tube that is sensitive into the far infrared region.

Another object of this invention is to provide a gateable infrared imaging tube.

Another object of this invention is to provide a portable infrared imaging tube.

Further objects and advantages of this invention will become more apparent from the following specification when taken with reference to the drawings of which:

FIG. 1 is an illustration of the basic principle of operation.

FIG. 2 is a schematic of an imaging tube.

Figure 3:
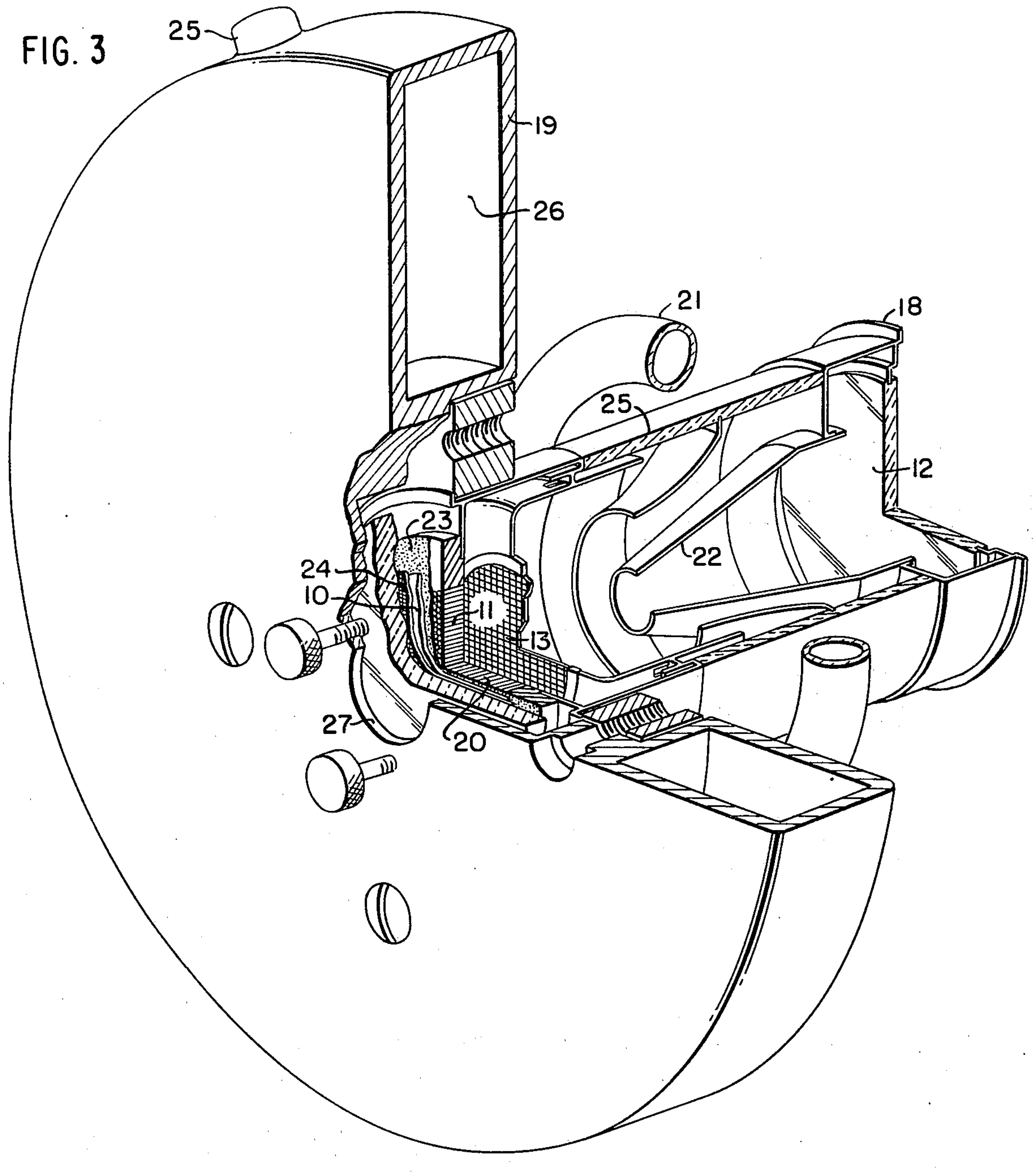
FIG. 3 is an expanded cutaway view of an imaging tube.

A single resolution element of the tube shown in FIG. 1 can be compared with a triode having an infrared sensitive photoconductor 10 as a cathode resistor. Flooding light 21 activates the photoemissive cathode 11 providing free electrons. The flow of free electrons from cathode 11 towards plate 12 is controlled by the potential between grid 13 and cathode 11. This potential is equal to the sum of grid bias 14 and the voltage drop across photoconductor 10.

The voltage drop across photoconductor 10 acts as a negative bias and is the product of the resistance of photoconductor 10 and the cathode current. Variation in the resistance of photoconductor 10 are produced by infrared radiation 15. Such variations produce a corresponding change in grid 13 to cathode 11 potential, which in turn, produces a variation in the flow of electrons toward plate 12.

Plate 12 in practice is an aluminized phosphor screen. Electrons which penetrate the control grid are accelerated by plate potential 16 and impinge on phosphor screen 12 releasing visible light 17.

FIG. 2 represents a more detailed schematic of the present invention. The significant difference in this illustration and the preceding one lie in the cathode section. Infrared radiation 15 impinges on photosensitive surface 10 that is in effect made up of numerous discrete points that act independently. Elemental changes in resistance on photosensitive surface 10 are connected by means of wire mosaic 20 to photoemissive cathode 11. Localized differences in resistance at surface 10 are reflected as localized differences in potential on the photoemissive surface 11. Both surfaces 10 and 11 are continuous although they are depicted as discontinuous. The lateral resistance on both surfaces is so large that each discrete point is effectively separated from its surrounding area.

An infrared image 15 of varying intensity which strikes surface 10 produces a corresponding image of variable resistance in surface 10. Wire mosaic 20 translates this image of variable resistance into an image of variable potential appearing on photoemissive cathode 11 which produces an image in terms of electron flow of variable magnitude penetrating grid 13 which finally impinge on phosphorous screen 12 thereby generating a visible image 17.

Referring to FIG. 3, an assembled cutaway view of the present invention is shown. Cooling jacket 19 is provided to cool the tube. Liquid nitrogen enters inlet 25 and is accumulated in area 26. During the cooling process the liquid nitrogen fumes into nitrogen gas which escapes by way of an outlet not shown. If liquid hydrogen or helium cooling is required, cooling jacket 19 will necessarily be replaced by a dewar.

Cooling jacket 19 is provided with a window 27 through which the infrared radiation enters the detector. If the radiation to be detected is below 5 microns in wavelength, the window material can be sapphire. If the radiation exceeds this wavelength, the window must be constructed of germanium.

The evacuated tube 18 is placed in cooling jacket 19 and surrounded by a donut shaped mercury vapor lamp 21 that provides light for photoemissive cathode 11. The light entering tube 18 by way of glass wall 25.

Sensing layer 10 is external to tube 18 and is pressed against wire mosaic 20 an integral part of tube 18.

Sensing layer 10 is a photoconductor and formed in the shape of a thin wafer. Its spectral response defines the spectral response of the entire device. It should have a resistivity of approximately $10^9$ ohm-cm in order to avoid the lateral flow of electrons alluded to above which will result in a degradation of the resolution capabilities of the device. The material from which the sensing layer is made must also have sufficient variation in resistance with infrared radiation to provide high sensitivity.

Photoconductive sensor 10 is fabricated from properly doped germanium. By controlling the amount and kind of doping the required spectral range, resistivity and sensitivity can be obtained. Copper doped germanium has a spectral range up to 27 microns; however, within this range the device must be helium cooled and window 27 must be made of germanium. Copper doped germanium which is antimony compensated has a spectral range of 3.5 microns which requires liquid nitrogen cooling, and a sapphire window 27. The sensing layer for the latter is prepared by first doping germanium with antimony then diffusing copper through a wafer of the material at 700°C in a hydrogen atmosphere.

In either event, a thin film of copper 24 is deposited on one side of wafer 10 to provide an electrical connection for biasing of the device as illustrated in FIG. 2. The film is also transparent to infrared radiation 15. In order to provide a good connection between wire mosaic 20 and sensing layer 10 which are pressed together, silver paste is deposited on the tips of the wires of wire mosaic 20.

Wire mosaic 20 connects sensing wafer 10 with photocathode 11 electrically while isolating the two from each other chemically and further permitting sensing wafer 10 to be mounted external to tube 18 which is evacuated.

Before assembly of the tube wire mosaic 20 which is composed of stainless steel wires insulated from each other by glass (presently consisting of approximately 300 wires per linear inch) has one side (the external side) etched with hydrofloric acid so that the wires protrude above the glass surface. The space between the wires is caulked with opaque material 23 which is a mixture of 3 grams of black enamel oxide and 4 $cm^3$ of amyl acetate with a like measure of nitrocellulous lacquer. This layer prevents flooding light 21 from passing through the glass from inside the tube to sensing photoconductor 10 which is sensitive to such light as well as infrared radiation.

The remaining side of wire mosaic 20 ultimately provides a substrate for photoemissive cathode 11. The photoemissive layer must have a high resistivity to prevent a degradation in the resolution capability of the device. Cesium antimonide provides such a layer. To control the resistivity of the layer a very thin layer of antimonide is deposited on wire mosaic 20. When finally assembled, tube 18 is evacuated and baked out at 270°C approximately 2 hours, the temperature is then dropped to approximately 150°C and held there, while cesium vapors are released into the tube. The cesium reacts with the antimonide producing the desired photoemissive surface. To control this operation, the antimonide surface is illuminated while current is caused to pass through the tube. When the current reaches a maximum and levels off, the process is complete.

Prior to assembly above, control grid 13, which is a flat, fine copper wire mesh of approximately 50% transmission and 750 openings per linear inch, is placed parallel to cathode 14 approximately 10 thousandths of an inch away from it.

The remainder of the tube is provided with electrostatic focussing 22 and an aluminized phosphor screen 12 at the readout end.

Examining FIG. 2 once again, it is seen that the flow of electrons can be controlled by turning off light 21 which will cut off the supply of free electrons, or the plate or bias voltages can be pulsed such that electron flow is impossible. Thus, three simple and effective means for gating the device are available.

While we have described the above principles of our invention in connection with specific apparatus, it is to be clearly understood that this description is only made by way of example and not as a limitation on the scope of our invention as set forth in the objects thereof and in the accompanying claims.

What is claimed is:

1. An infrared imaging device comprising, cooling means for lowering the temperature of the device, a wafer of preselected infrared sensitive material, a layer of thin infrared transparent electrically conductive material deposited on one side of said wafer, a wire mosaic, said wire mosaic in intimate contact with the remaining side of said wafer, opaque material filling a preselected area between the wires of said wire mosaic, silver paste interposed between said wafer and the tips of the wires of said wire mosaic, a photoemissive surface deposited on one side of said wire mosaic, an evacuated tube having a grid, focusing means, and a phosphor screen at one end, said wire mosaic forming the other end of said tube, lamp means for illuminating said photoemissive surface thereby providing free electrons, voltage accelerating means whereby said free electrons are accelerated toward said phosphor screen and focussed on said screen in a predetermined manner, fixed bias means whereby free electrons are confined between said grid and said photoemissive cathode whereby the resistance of said infrared sensitive wafer cooperating with grid current flow reduces said bias permitting flow of electrons according to infrared radiation impinging on said wafer.

2. An infrared imaging tube according to claim 1 wherein said wafer of said infrared sensitive material is antimony compensated copper doped germanium, said opaque material is a mixture of black enamel oxide and nitrocellulous, and said photoemissive surface is cesium antimonide.

3. An infrared imaging tube according to claim 1 wherein said wafer of said infrared sensitive material is copper doped germanium, said opaque material is a mixture of black enamel oxide and nitrocellulous, and said photoemissive surface is cesium antimonide.

4. An infrared imaging device comprising, cooling means for maintaining the device at a preselected temperature; a wafer of copper doped antimony compensated germanium, a conducting surface pressed against one side of said wafer; said conducting surface penetrable by infrared radiation; an evacuated tube having at one end a wire mosaic surface of stainless steel wire and glass, said outside glass surface of said wire mosaic etched back a preselected distance, a light impervious filler of black enamel oxide and nitrocellulous filling the space between wires of said etched surface, silver paste on the outside tips of the stainless steel wires of said wire mosaic to provide a good electrical contact when said wafer is pressed against said wire mosaic surface of said evacuated tube, a cesium antimonide surface deposited on the inside surface of said wire mosaic, a grid disposed a preselected distance from said inside surface of said wire mosaic, an electrostatic focussing means disposed within said tube, an aluminized phosphorous screen deposited at an end of said tube opposite said wire mosaic; said wafer and said tube pressed together such that the tips of stainless steel wire are in intimate electrical contact with said wafer, a donut shaped mercury vapor lamp disposed about the tube so as to illuminate the cesium antimonide surface; a grid bias voltage source connecting said conductive surface on said wafer and said grid within said evacuated tube, an accelerating voltage source connecting said conducting surface on said wafer and said aluminized phosphorous screen whereby infrared radiation varying the resistance of portions of said wafer enable electrons freed from said cesium antimony surface in the close proximity to said portion of said wafer that are ordinarily restrained by said bias to be accelerated to said aluminized phosphorous screen thereby producing a visible image on said screen in accordance with the infrared image impinging on said infrared wafer.

5. An infrared imaging device according to claim 4 which further includes means for gating said mercury lamp on and off.

* * * * *